United States Patent [19]
Johnson et al.

[11] Patent Number: 6,012,700
[45] Date of Patent: Jan. 11, 2000

[54] OVERMOLDED SOLENOID VALVE

[75] Inventors: Timothy L. Johnson, Erie; James W. Neuburger, Jr., Fairview, both of Pa.

[73] Assignee: Snap-Tite Technolgoies, Inc., Wilmington, Del.

[21] Appl. No.: 09/177,263

[22] Filed: Oct. 22, 1998

[51] Int. Cl.[7] ................................................. F16K 31/06
[52] U.S. Cl. ............................ 251/129.15; 251/129.21; 137/625.65
[58] Field of Search ..................... 251/129.02, 129.21, 251/129.15; 137/625.65

[56] References Cited

U.S. PATENT DOCUMENTS

| | | | |
|---|---|---|---|
| Re. 32,783 | 11/1988 | Clark . | |
| 3,172,637 | 3/1965 | Adams et al. | 251/129.21 X |
| 3,633,139 | 1/1972 | Thompson . | |
| 4,056,255 | 11/1977 | Lace | 251/129.15 |
| 4,251,052 | 2/1981 | Hertfelder et al. | 251/129 |
| 4,476,450 | 10/1984 | Brown | 335/196 |
| 4,604,600 | 8/1986 | Clark . | |
| 4,697,608 | 10/1987 | Kolze et al. | 251/129.15 X |
| 4,830,333 | 5/1989 | Watson | 251/129.18 |
| 5,123,718 | 6/1992 | Tyler . | |
| 5,139,226 | 8/1992 | Baldwin et al. | 137/625.65 X |
| 5,145,148 | 9/1992 | Laurent | 251/129.15 X |
| 5,234,265 | 8/1993 | Tyler . | |
| 5,465,910 | 11/1995 | Hall et al. | 251/129.21 X |
| 5,704,553 | 1/1998 | Wieczorek | 251/129.21 X |
| 5,710,535 | 1/1998 | Goloff . | |
| 5,918,818 | 7/1999 | Takeda | 251/129.15 X |

*Primary Examiner*—Stephen M. Hepperle
*Assistant Examiner*—Meredith H. Schoenfeld
*Attorney, Agent, or Firm*—Woodling, Krost and Rust

[57] ABSTRACT

A solenoid valve including a body, plunger, stop, bobbin, coil, and strap is disclosed. One embodiment is a normally open solenoid valve and one embodiment is a normally closed solenoid valve. The bobbin, coil and strap are encapsulated by a glass-filled nylon cover. The strap and the glass-filled nylon restrain the stop. A body is ultrasonically welded to the glass-filled nylon cover. In the normally open embodiment a first body has a single port. In the normally closed embodiment a second body has two ports. The plunger includes grooves and sections of reduced diameter, or channels, which allow for communication between the stop and the body. A method for making the solenoid valve is also disclosed and claimed.

20 Claims, 9 Drawing Sheets

1A

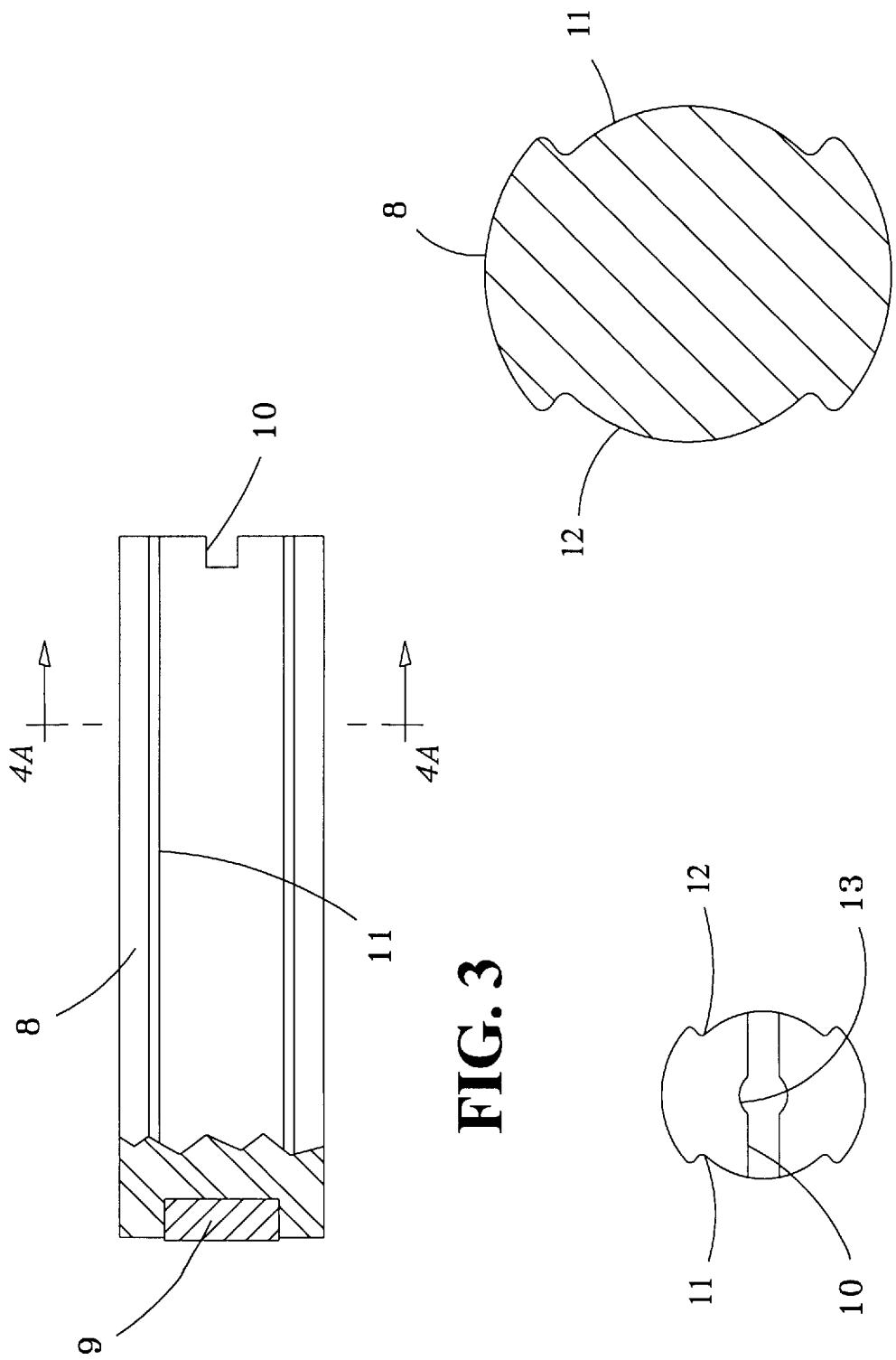

OVERMOLDED SOLENOID VALVE

FIELD OF THE INVENTION

The instant invention is a solenoid valve for use in an automatic brake system. Other applications for this technology exist. The solenoid valves are immovably mounted to the frame of the vehicle.

BACKGROUND OF THE INVENTION

The instant invention does not have any exposed parts. Road salt, dirt and rocks may not enter the solenoid valve of the instant invention which is substantially encapsulated with a glass-filled nylon housing. A glass-filled nylon body is ultrasonically welded to the housing. The nylon housing seals against the body, bobbin, stop, coil and straps. Thus, a completely sealed solenoid valve is provided. The housing in combination with the body completely seals the solenoid valve from dirt and other contaminants.

Other solenoid valves for use in automatic brake systems are known such as U.S. Pat. No. 5,123,718 to Tyler and U.S. Pat. No. 5,234,265 to Tyler. Neither of these patents teach encapsulation of the solenoid valve with a nylon housing so as to prevent road salt, dirt and rocks from entering the valves. These related art solenoid valves employ an armature movable within a core.

U.S. Pat. No. 5,710,535 to Goloff discloses an encapsulated coil, bobbin and insert. The insert in Goloff prevents contaminants from entering the coil assembly along the electrical leads.

Other related art devices such as U.S. Pat. No. 4,604,600 to Clark, U.S. Pat. No. RE 32,873 to Clark, and U.S. Pat. No. 3,633,139 to Thompson employ armature guide tubes. The instant invention does not employ guide tubes. The armature, or plunger of the instant invention, is guided by the bobbin.

The related art does not teach or suggest a body affixed to a housing molded over the coil and bobbin. Nor does the related art teach or suggest an overmolded housing which restrains the stop and is ultrasonically welded to the body.

A solenoid valve partially encapsulated by glass filled nylon is disclosed. Preferably, the encapsulant is a 33% glass-filled nylon sold under the trademark ZYTEL which is believed to be a trademark of Dupont Corporation. Other materials may be used for the encapsulant. Two embodiments are disclosed.

In the first embodiment, a body having a first port is disclosed. A plunger is employed which includes a sealing insert which either blocks or permits flow through a stop. The sealing insert is operated against a bore in a stop. The insert is rubber and it is bonded to stainless steel. The stop includes a crowned surface which facilitates sealing by the insert.

In the second embodiment, a body having a first port and second port is disclosed. A plunger is employed which includes an insert operable against one of the ports in the body.

The two embodiments are similar but have notable differences. First, the bodies are different in each embodiment. Second, the plunger orientation in the second embodiment is reversed. A stop having a crowned surface is used in the first embodiment and a stop having a flat surface is used in the second embodiment.

In the first embodiment the insert is operable against the crowned surface of the stop and in the second embodiment the insert is operable against the body. The plunger of the invention includes two longitudinal channels which run down the side of an otherwise cylindrical plunger. One end of the plunger includes a bore and a groove communicating with the bore. The plunger is made of stainless steel and includes a rubber insert which is 0.093 to 0.099 inches thick. The plunger is primarily guided by the bobbin.

A stop is utilized in the invention and includes a bore therethrough. A spring resides between the stop and the plunger urging the plunger away from the stop and toward the body. The stops, in both embodiments, are restrained by the housing.

Glass-filled nylon is molded over: the bobbin; the coil wound around the bobbin; and, the straps. The straps and the nylon housing restrain the stop and secure it in place. The glass-filled nylon body is ultrasonically welded to the glass-filled nylon housing.

It is an object of the present invention to provide a solenoid valve which does not admit rocks, salt, water or other debris thereto.

It is a further object of the present invention to provide a solenoid valve which includes a glass-filled nylon housing.

It is a further object of the present invention to provide a solenoid valve which does not include a guide tube.

It is a further object of the present invention to provide a solenoid valve which includes rubber bonded to a stainless steel plunger for sealing against an orifice.

It is a further object of the present invention to provide a solenoid valve which includes a plunger having longitudinal channels and a bore communicating with a groove at one end thereof.

It is a further object of the present invention to provide a normally open solenoid valve which includes a plunger oriented such that it is operable between first (open, deenergized) and second (closed, energized) positions against a stop.

It is a further object of the present invention to provide a normally closed solenoid valve which includes a plunger oriented such that it is operable between first (closed, deenergized) and second (open, energized) positions against an orifice in a body.

It is a further object of the present invention to provide a solenoid valve which includes a stop having a bore.

It is a further object of the present invention to provide a solenoid valve having a body ultrasonically welded to a housing.

It is a further object of the present invention to provide a solenoid valve which employs the bobbin to guide the plunger.

It is a further object of the present invention to provide a stop having a crowned surface and a bore therethrough. The crowned surface is operable against a rubber insert.

Additional objects of the invention will be understood when the following Brief Description of the Drawings and Detailed Description of the Invention are read.

BRIEF DESCRIPTION OF THE DRAWINGS

FIG. 3 is a partial cross-sectional view of the plunger.

FIG. 4 is the right end view of the plunger illustrated in FIG. 3.

FIG. 4A is an enlarged cross-sectional view taken along the lines 4A—4A of FIG. 3.

A better understanding of the invention will be had by referring to the Detailed Description of the Invention and claims which follow hereinbelow.

DETAILED DESCRIPTION OF THE INVENTION

Figure 1:
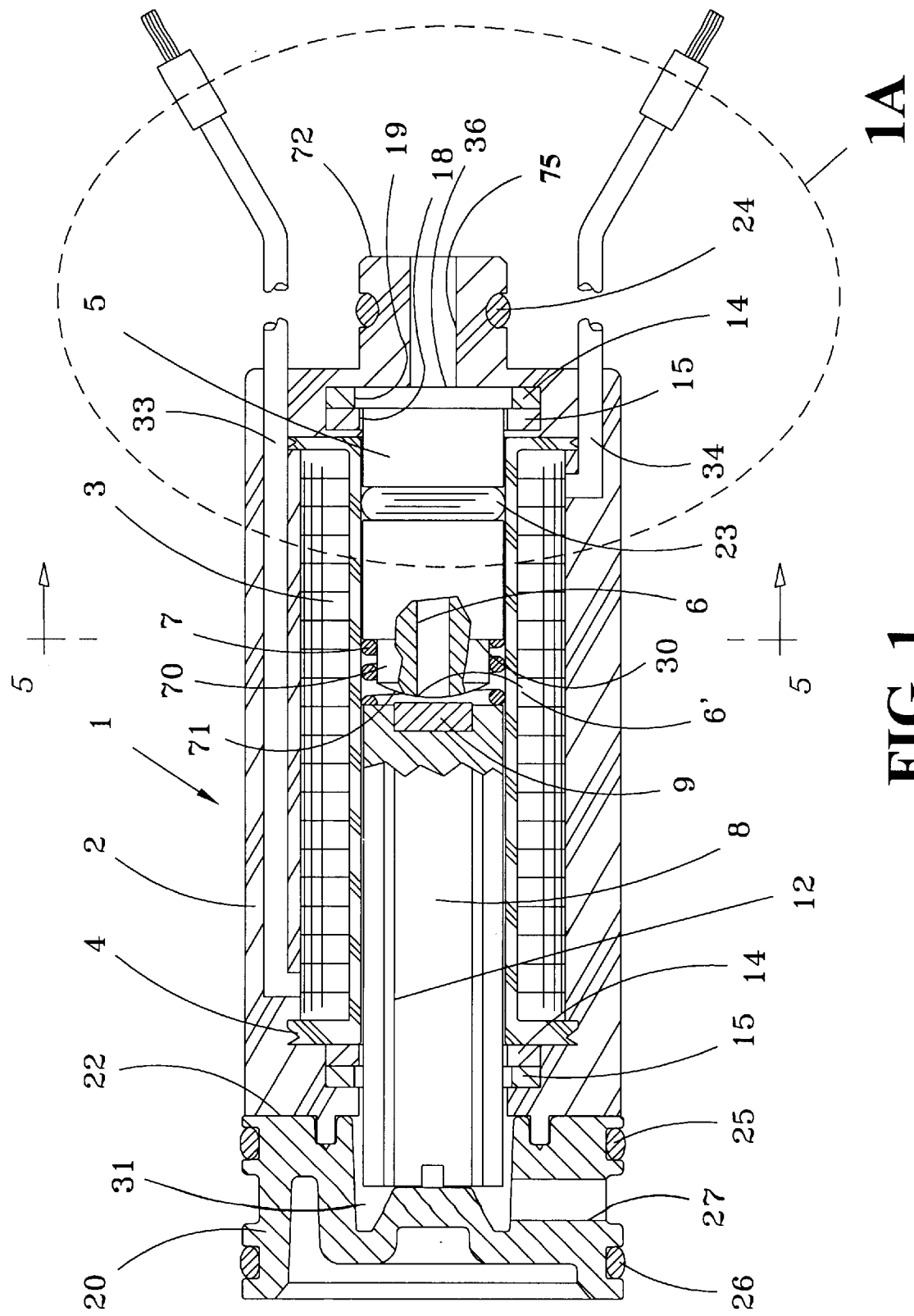
FIG. 1 is a partial cross-sectional view of a first embodiment of a solenoid valve.

FIG. 1 is a partial cross-sectional view of the first embodiment of the solenoid valve 1. When the coil 3 is in its deenergized condition, air or other fluid may pass through bore 6 unimpeded because the insert 9 of the plunger 8 is not seated against stop 5. Plunger 8 is made of stainless steel and includes an insert 9 of rubber bonded to the stainless steel. The rubber is approximately in the range of 0.093 to 0.099 inches thick. The insert 9 is cylindrically shaped and is made from rubber so as to seal effectively against the aperture 6' of bore 6 in the stop 5.

Referring to FIG. 1, air passes through stop 5 by way of bore 6 and along longitudinal channels 11 and 12 to chamber 31 and subsequently to transverse port 27. Air pressure is typically supplied to the right end portion 72 of housing 2 by an external source. Housing 2 includes a bore 75 which is concentric with bore 6 of stop 5 in FIG. 1 and stop 5' in FIG. 2. Of course, air may be supplied from port 27 to chamber 31 and then via longitudinal channels 11 and 12 and subsequently to and through bore 6. Longitudinal channels 11 and 12 are best viewed on FIGS. 4 and 4A.

Figure 1A:
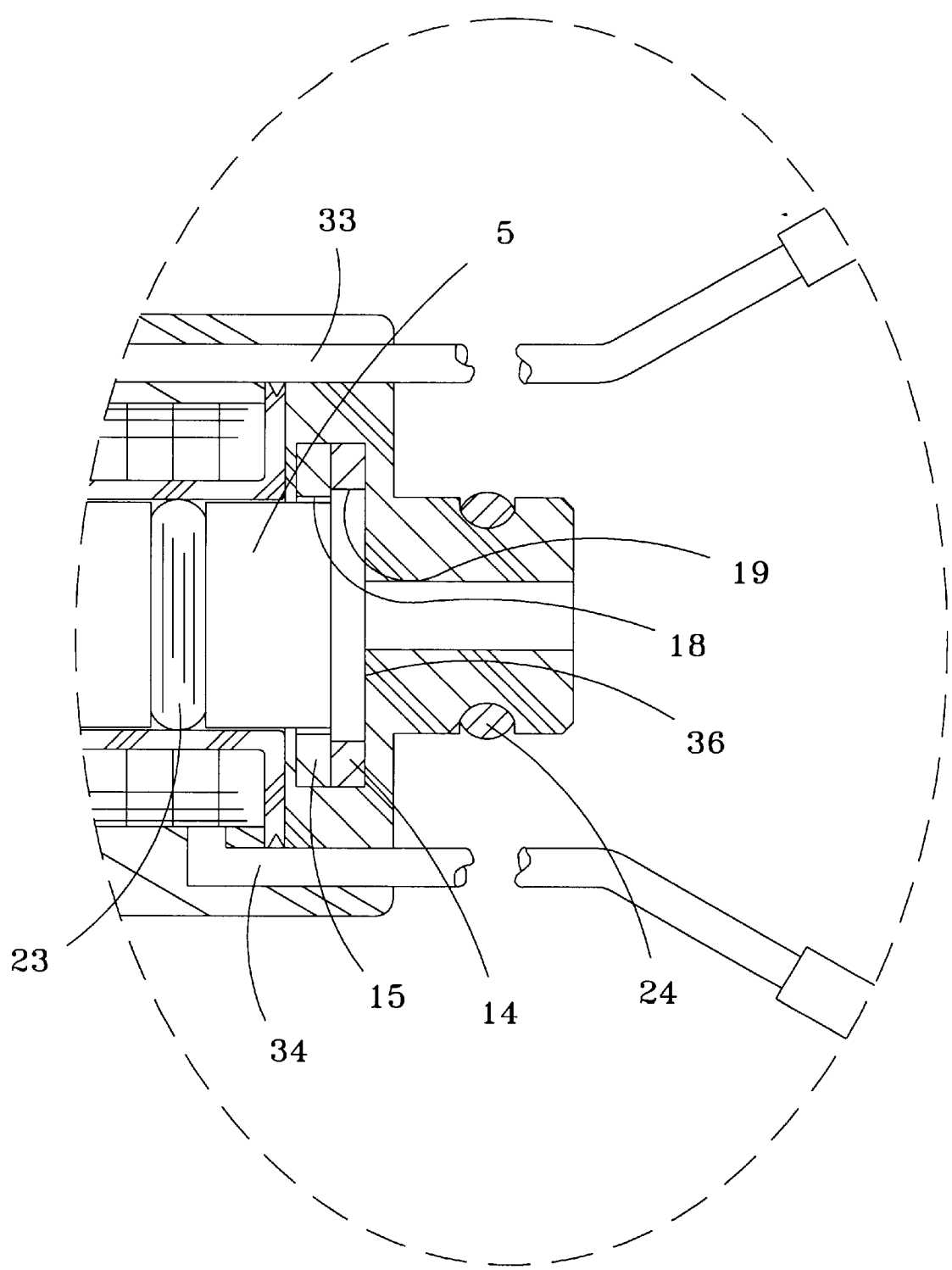
FIG. 1A is an enlarged section of a portion of FIG. 1.
Figure 8:
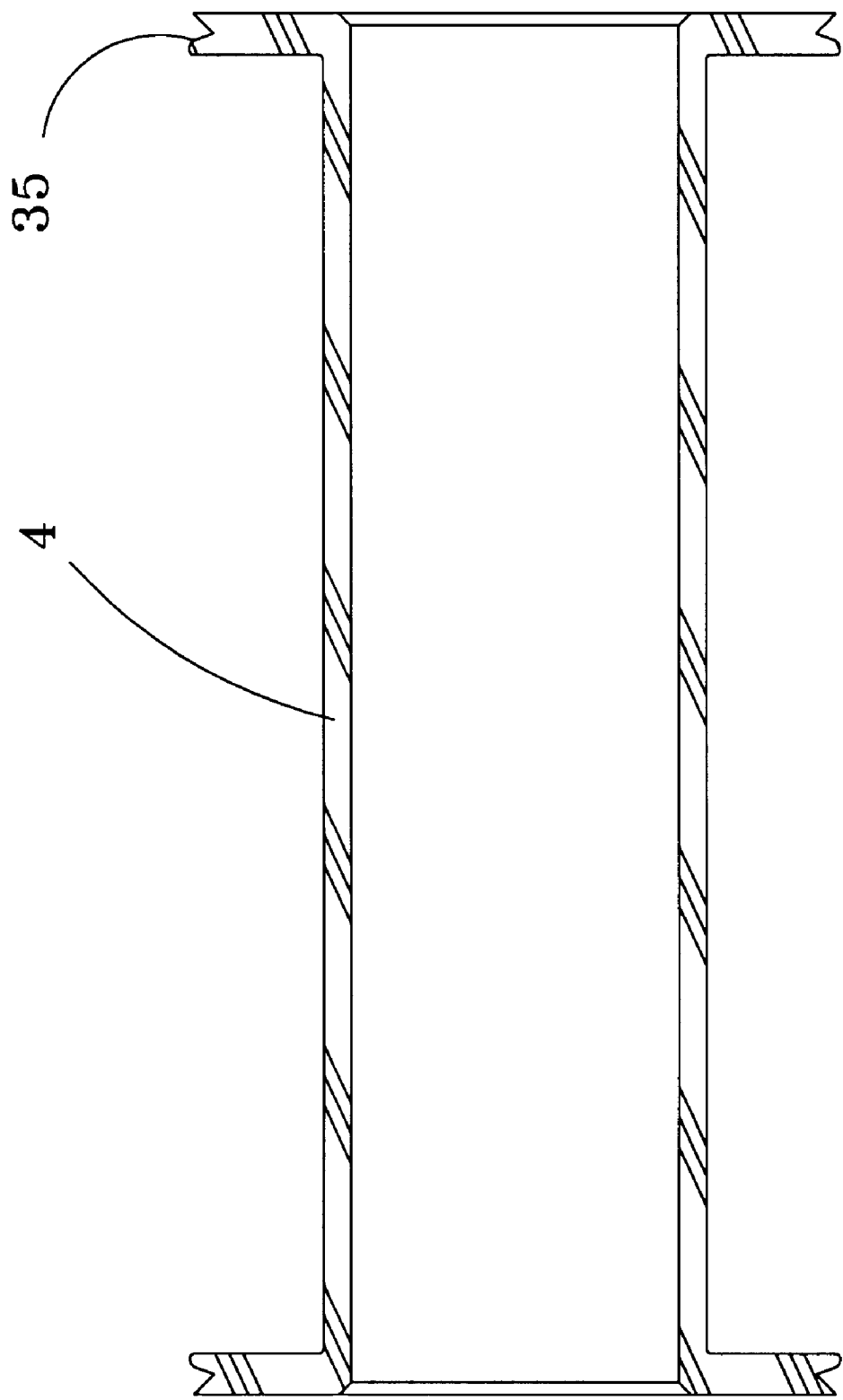
FIG. 8 is a cross-sectional view of the bobbin illustrating the configuration of the edges on the upper and lower portions of the bobbin to facilitate the overmolding of nylon to the bobbin and the coil.

Referring again to FIG. 1, housing 2 is glass-filled nylon. The housing 2 is molded over the coil 3, bobbin 4, stop 5, and straps 14 and 15. Stop 5 and straps 14, 15 are made of steel. Stop 5 includes a flange 36. Flange 36 is secured between strap 15 and the molded housing. See, FIG. 1A. Coil 3 is copper and is wound around bobbin 4. Spring 7 operates against shoulder 30 of stop 5 and plunger 8 and urges the plunger away from the stop 5 and into engagement with the body 20. Referring to FIG. 8, the bobbin is made of glass-filled nylon and includes jagged edges on its flanges.

Stop 5 includes a left end portion 70 having a crowned surface 71. The crowned surface 71 does not engage the insert 9 as shown in FIG. 1. When coil 3 is energized insert 9 seals against the crowned surface 71 on stop 5 preventing the flow of air or other fluid from aperture 6'.

Figure 2:
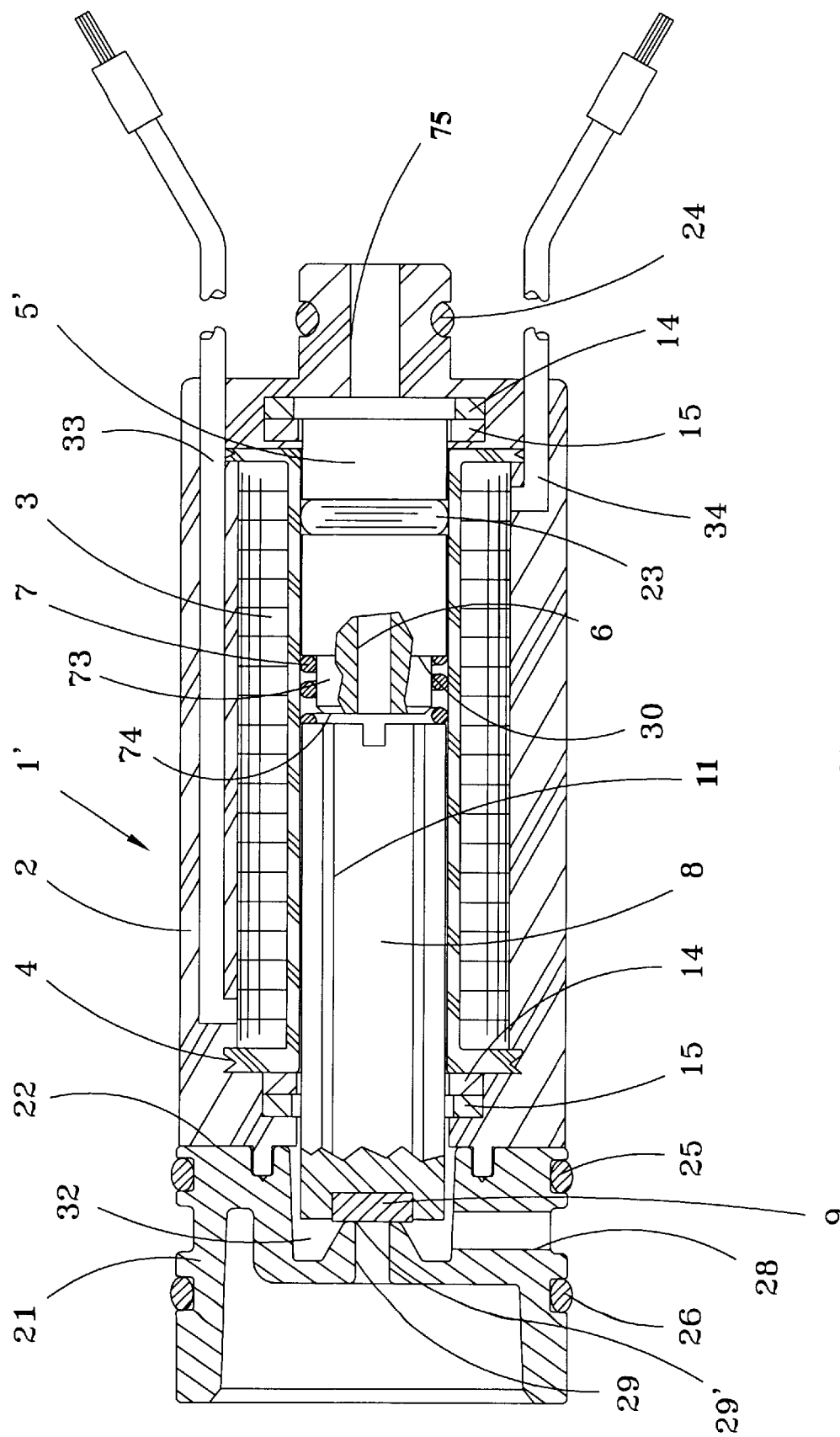
FIG. 2 is a partial cross-sectional view of a second embodiment of a solenoid valve.

Referring to FIG. 1 the body 20 is made of glass-filled nylon and it is ultrasonically welded to the glass-filled housing. Referring to FIGS. 3, 4 and 4A the plunger is illustrated. FIG. 3 illustrates the plunger 8 in the orientation of FIG. 2. FIG. 2 is a second embodiment of the invention. The embodiments of FIGS. 1 and 2 use the same plunger 8. However, in FIG. 2 the rubber bonded insert 9 operates and valves against the body 21 not the stop 5.

FIG. 3 illustrates longitudinal channel 11 and groove 10. FIG. 4 is the right end view of the plunger illustrated in FIG. 3. FIG. 4 illustrates groove 10 and cylindrical bore 13. Groove 10 communicates with longitudinal channels 11 and 12.

Thus, when plunger 8 is employed in the second embodiment as illustrated in FIG. 2, the rotational orientation of the plunger does not affect the flow of the air when the coil 3 is energized. When coil 3 is energized air will flow through ports 28 and 29.

FIG. 4A is an enlarged cross-sectional view taken along the lines 4A—4A of FIG. 3. FIGS. 4 and 4A illustrate longitudinal channels 11 and 12 which permit air or other fluid to pass along the plunger 8 when it is within the bobbin 4. See, FIGS. 1 and 2. Obviously, in the embodiment of FIG. 1, no communication of air takes place when the coil is energized.

Figure 5:
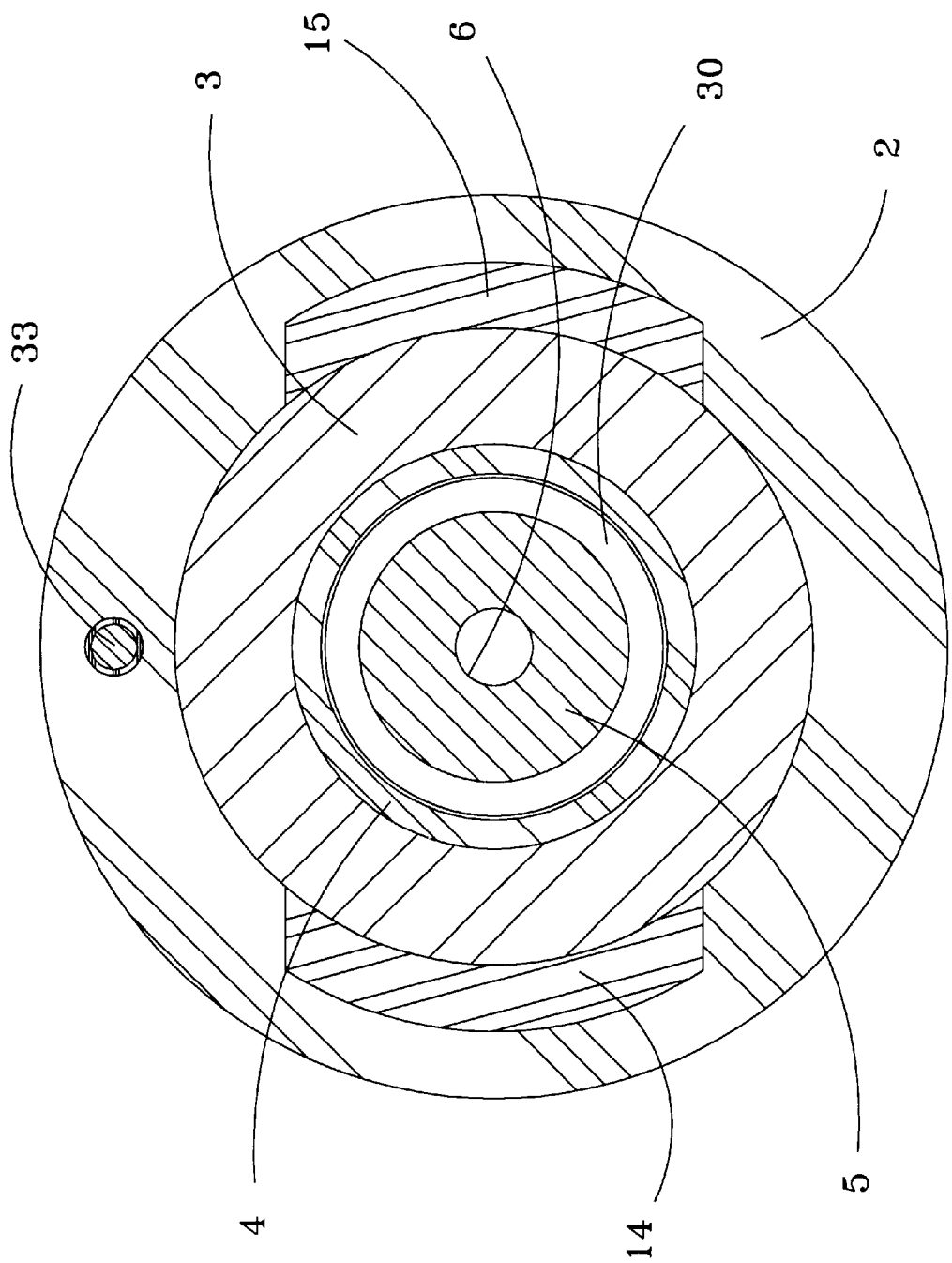
FIG. 5 is an enlarged cross-sectional view of the solenoid valve of FIG. 1 taken along the lines 5—5 of FIG. 1.

FIG. 5 is a cross-sectional view of the solenoid valve of FIG. 1 taken along the lines 5—5 of FIG. 1. FIG. 5 illustrates shoulder 30 on stop 5, bore 6 in stop 5, stop 5 in cross-section, the bobbin 4 in cross-section, straps 14 and 15 in cross-section, and the coil 3 and housing 2 in cross-section.

Figure 7:
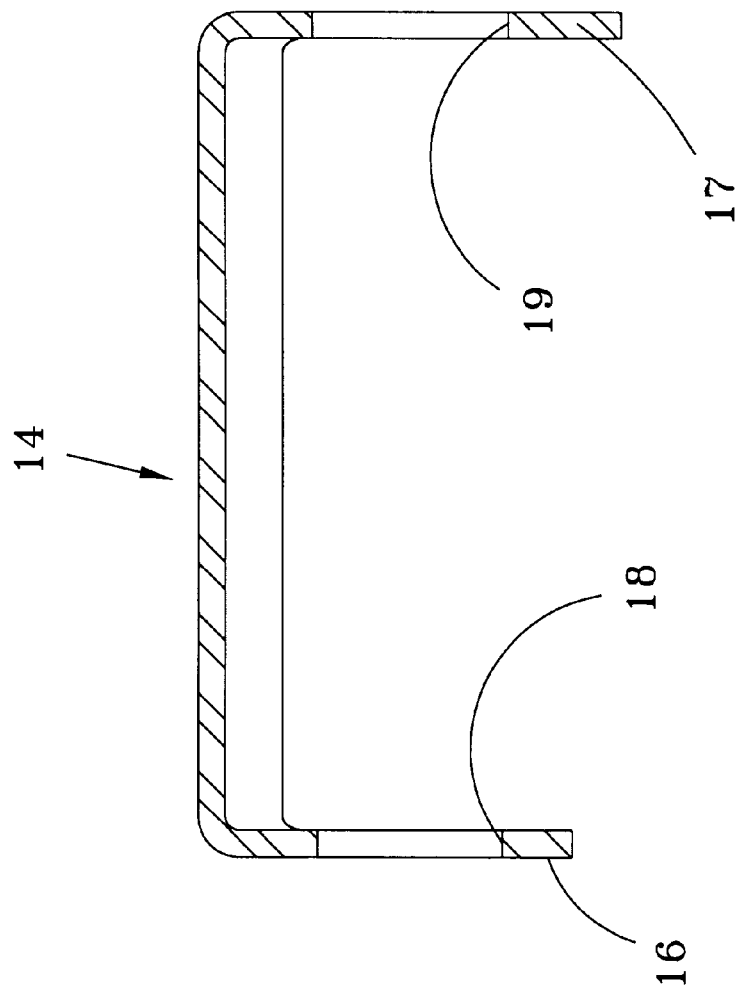
FIG. 7 is a cross-sectional view of one of the straps taken along the lines 7—7 of FIG. 6.
Figure 6:
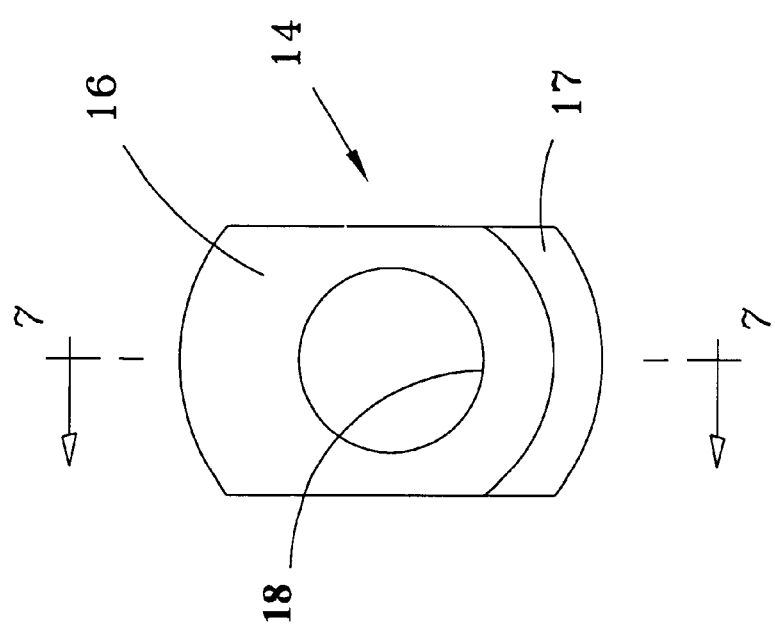
FIG. 6 is an end view of one of the straps.

FIG. 6 is an end view of one of the straps 14, 15. The straps each include a short end 16 and a long end 17. The straps function to improve the magnetic circuit when the coil is energized. FIG. 7 is a cross-sectional view of one of the straps taken along the lines 7—7 of FIG. 6. Reference numerals 18 and 19 are apertures for the plunger and the stop. The straps are arranged such that the long leg of one strap resides adjacent the short leg of the other strap. There are two straps 14, 15 employed in each embodiment.

The diameter of aperture 19 is larger than the diameter of aperture 18. The diameter of aperture 19 of strap 14 permits the flange 36 on the stop 5 to snugly fit within aperture 19 of strap 14 and abut strap 15. The housing 2 is molded over flange 36 of the stop and secures the stop so that it may not be removed from the solenoid valve.

FIG. 1, the first embodiment, is the normally open embodiment meaning that the rubber insert 9 is spaced away from aperture 6' of bore 6 of stop 5 when the coil is deenergized permitting air to flow. The rubber insert 9 is cylindrically shaped and protrudes slightly from the plunger. See, FIGS. 1, 2 and 3 to view the insert 9. Referring to FIG. 1, when the coil 3 is energized the plunger moves rightwardly until the insert 9 seals the aperture 6'. The rotational orientation of the plunger does not affect the sealing of aperture 6' because seal 9 has a circular surface. Seal 9 is cylindrically shaped and the sealing end is a circular surface. Still referring to FIG. 1, air will flow to port 27 when the coil is deenergized despite the orientation of the plunger 8 because longitudinal channels 11, 12 always communicate with chamber 31.

FIG. 2, the second embodiment, is the normally closed embodiment. Reference numeral 1' indicates the second embodiment of the invention. Stop 5' is employed in FIG. 2 and it has an end portion 73 which includes a flat face 74. The insert 9 seals the longitudinal port 29 when the coil is deenergized under the force of spring 7. Port 29 is thus normally closed with no electrical power applied to the coil 3. Chamber 32 in body 21 communicates with longitudinal channels 11 and 12. Body 21 of FIG. 2 includes a transverse port 28 whereby communication is always enabled between port 28 and bore 6 despite the rotational orientation of plunger 8.

It will be appreciated by those skilled in the art that the terms normally open and normally closed are used in regard to the position of the sealing insert 9 relative to the aperture 6' and relative to the aperture 29' of body 21, respectively, with no power applied to the coil 3. See, FIGS. 1 and 2.

Reference numeral 22 in FIGS. 1 and 2 indicates the ultrasonic welding of the housing 2 to the bodies 20, 21. Seal 23 prevents air from escaping along the interface of the stops 5 and 5' and bobbin 4. Seals 24, 25 and 26 are exterior seals. Bodies 20 or 21 are typically secured to the frame of the vehicle by means of a clip. Stops 5 and 5' are typically inserted into a fitting from which air pressure is supplied.

Figure 9:
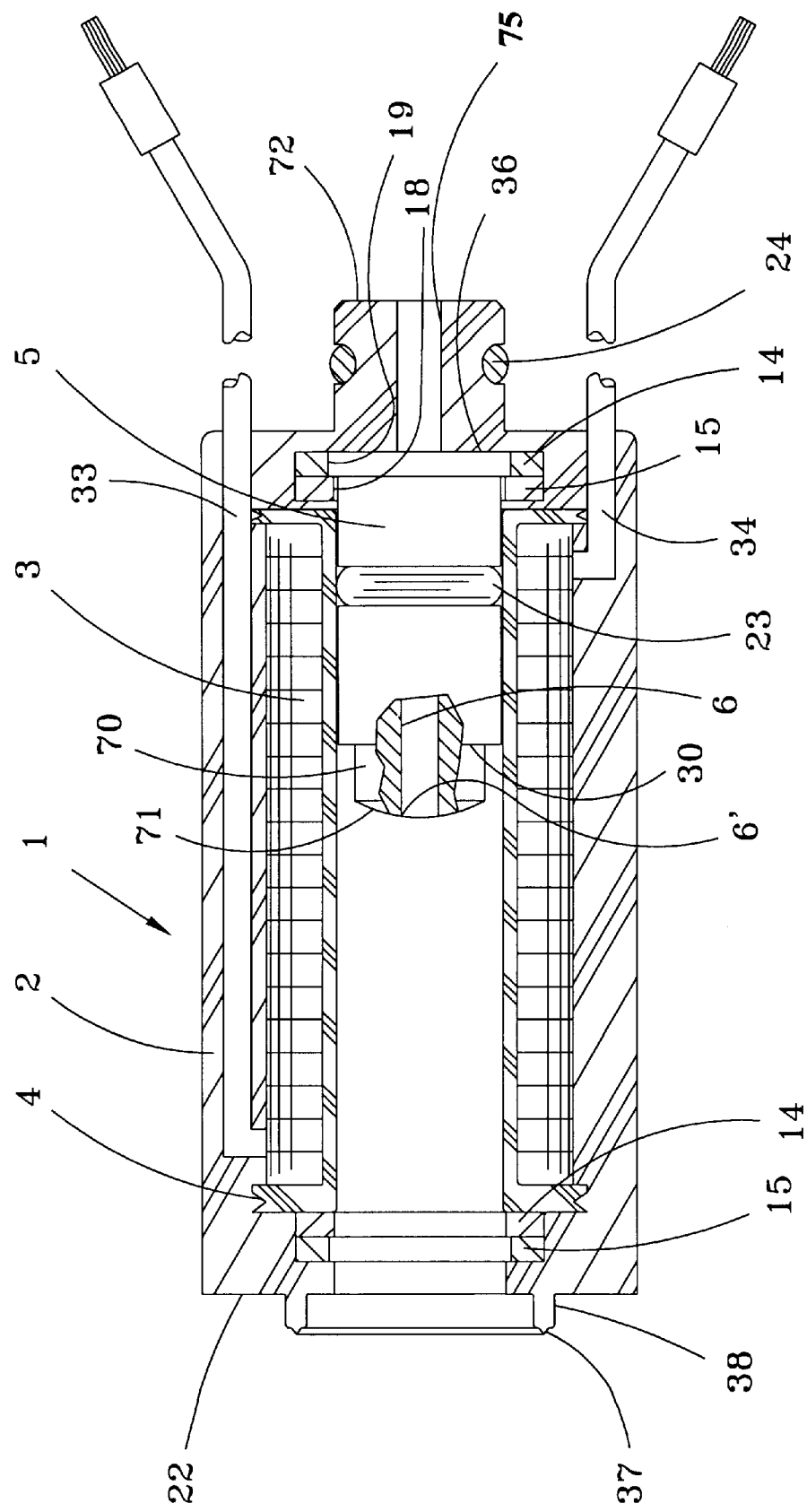
FIG. 9 is the same as FIG. 1 except the body, plunger and spring are not included.
Figure 10:
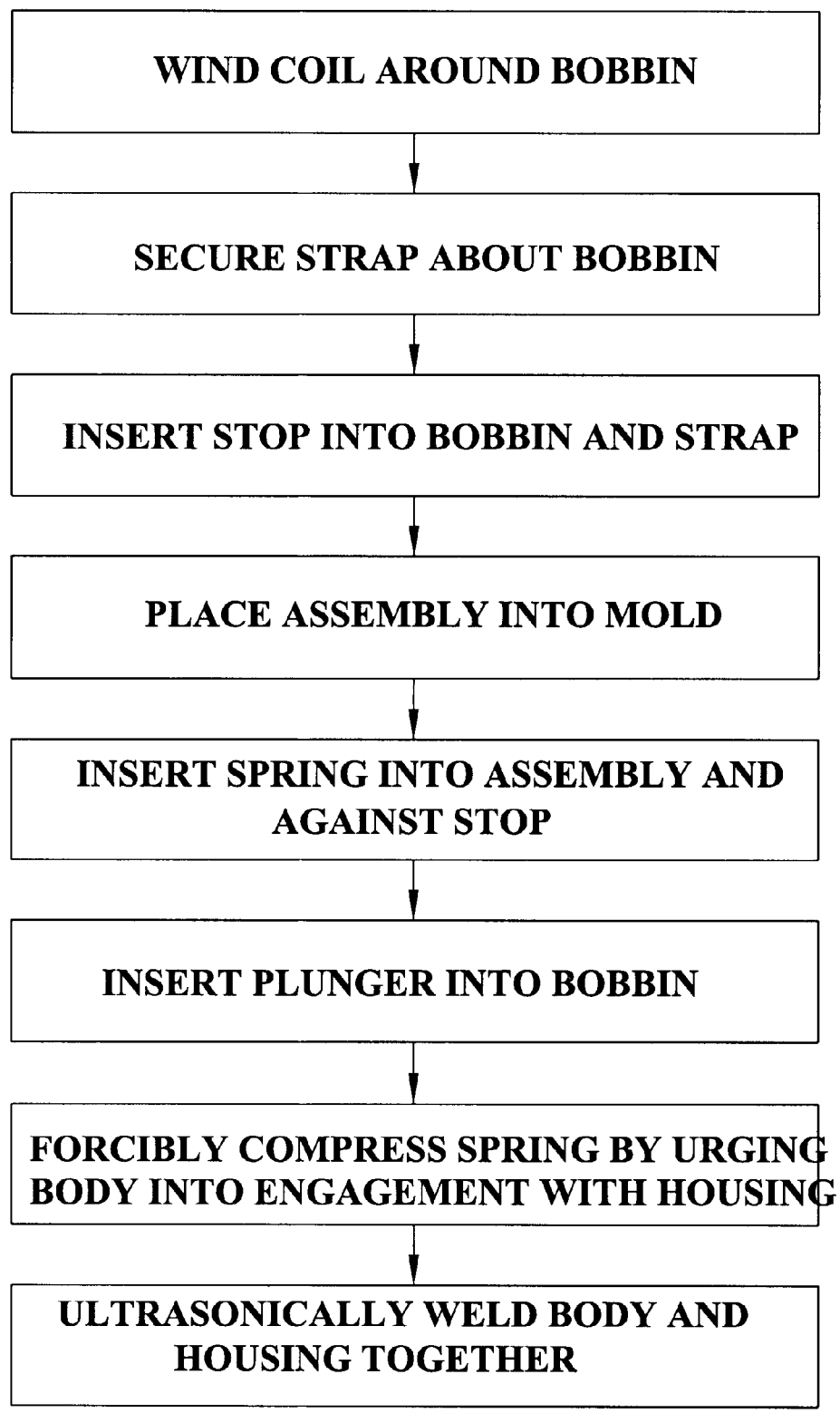
FIG. 10 is a diagram of the process steps.

Referring to FIGS. 8 and 9, it will be noted that reference numeral 35 indicates a jagged edge on one of the flanges of the bobbin and that reference numeral 37 indicates a rim on protrusion 38 of the housing 2. The pointed surfaces facilitate overmolding of the bobbin 4 and the ultrasonic welding of either body 20 or 21 to the overmolded housing 2.

To make the invention the coil is wound around the bobbin. The two leads are suspended or otherwise positioned so that a housing may be molded over the bobbin and the coil. A strap, or straps, are then secured about the bobbin. The straps, if properly sized, will snugly fit about the bobbin. The stop is then inserted into the bobbin and the strap. The assembly is then placed into a suitable mold so as to form the housing.

The mold will form the rim 37 on protrusion 38 and will also include a stud for ensuring that no mold material (i.e., nylon) will intrude into the interior of the bobbin. Next, the spring and the plunger are inserted into the bobbin. The spring seats against the shoulder 30 on stop 5 or 5' and against the plunger 8. The body 20 or 21 is then brought into engagement with the plunger and then the spring is forcibly compressed. While the body 20 or 21 is held against the housing it is ultrasonically welded to the housing.

The foregoing description of the invention does not limit the scope of the invention. Those skilled in the art will recognize that many changes may be made to the invention without departing from the spirit and scope of the appended claims.

We claim:

1. A solenoid valve comprising: a bobbin; a coil wound around said bobbin; a plunger residing within said bobbin; a stop having a bore therethrough; a housing molded over said bobbin, said coil and said stop; and, a body ultrasonically welded to said housing.

2. A solenoid valve comprising: a bobbin; a coil wound around said bobbin; a stop; a plunger residing within said bobbin and moveable between said first and second positions; an overmolded housing enveloping said bobbin, said coil and said stop; and, a body affixed to said overmolded housing.

3. A solenoid valve as claimed in claim 2 wherein said bobbin is glass-filled nylon.

4. A solenoid valve as claimed in claim 1 wherein said body includes a first port.

5. A solenoid valve as claimed in claim 1 wherein said body includes a first port and a second port.

6. A solenoid valve as claimed in claim 2 wherein said body includes a first port.

7. A solenoid valve as claimed in claim 2 wherein said body includes a first port and a second port.

8. A solenoid valve comprising: a bobbin; a coil wound around said bobbin; a stop; a plunger; a body; a spring residing between said stop and said plunger urging said plunger away from said stop; and, a housing affixed to said bobbin, said coil and said stop.

9. A solenoid valve as claimed in claim 8 wherein said plunger includes rubber bonded to stainless steel.

10. A solenoid valve as claimed in claim 8 wherein said plunger is generally cylindrically shaped and includes exterior channel therein.

11. A solenoid valve as claimed in claim 10 wherein said plunger further includes a groove in one end thereof for communication with said channel.

12. A solenoid valve as claimed in claim 11 wherein said plunger further includes an insert at the end opposite of the end having said groove.

13. A solenoid valve as claimed in claim 8 wherein said stop includes a bore therethrough and said plunger includes an exterior longitudinal channel and a groove at one end thereof for communication between said stop and said body.

14. A solenoid valve as claimed in claim 13 wherein said body includes a first port.

15. A solenoid valve as claimed in claim 14 wherein said body includes a first port and a second port.

16. A solenoid valve comprising: a bobbin, a coil would around said bobbin, a stop, a plunger, said plunger includes a longitudinal channel and said stop includes a bore, a body, and a housing molded over said bobbin, said coil, and said stop.

17. A solenoid valve as claimed in claim 16 wherein said body includes a first port.

18. A solenoid valve as claimed in claim 16 wherein said body includes a first port and a second port.

19. A solenoid valve as claimed in claim 8 wherein said housing and said body are glass-filled nylon.

20. A method of manufacturing a solenoid valve having a coil, bobbin, a strap, a plunger, a spring, a stop, and a housing, comprising the steps of:

winding said coil around said bobbin;

securing said strap on said bobbin;

inserting said stop into said strap and said bobbin;

molding said housing over said coil, bobbin, strap and stop;

inserting said spring and said plunger in said bobbin; and, ultrasonically welding said body to said housing.

\* \* \* \* \*